United States Patent [19]

Kessler et al.

[11] Patent Number: 5,841,973

[45] Date of Patent: Nov. 24, 1998

[54] MESSAGING IN DISTRIBUTED MEMORY MULTIPROCESSING SYSTEM HAVING SHELL CIRCUITRY FOR ATOMIC CONTROL OF MESSAGE STORAGE QUEUE'S TAIL POINTER STRUCTURE IN LOCAL MEMORY

[75] Inventors: Richard E. Kessler, Eau Claire; Steven M. Oberlin, Chippewa Falls; Steven L. Scott, Eau Claire, all of Wis.

[73] Assignee: Cray Research, Inc., Eagan, Minn.

[21] Appl. No.: 615,694

[22] Filed: Mar. 13, 1996

[51] Int. Cl.$^6$ .............................. G06F 13/38; G06F 15/16; G06F 15/173

[52] U.S. Cl. .................. 395/200.8; 395/872; 395/800.14

[58] Field of Search ....................... 370/413, 414; 395/200.75, 800.11, 800.12, 200.8, 200.43, 200.46, 200.45, 872, 874, 877, 800.14

[56] References Cited

U.S. PATENT DOCUMENTS

| | | | |
|---|---|---|---|
| 4,933,933 | 6/1990 | Dally et al. | 370/60 |
| 4,965,793 | 10/1990 | Polzin et al. | 370/94 |
| 4,980,852 | 12/1990 | Giroir et al. | 364/900 |
| 4,995,056 | 2/1991 | Fogg et al. | 375/7 |
| 5,008,882 | 4/1991 | Peterson et al. | 370/943 |
| 5,027,330 | 6/1991 | Miller | 365/239 |
| 5,036,459 | 7/1991 | Den Haan et al. | 364/200 |
| 5,068,784 | 11/1991 | Kishino et al. | 395/275 |
| 5,105,424 | 4/1992 | Flaig et al. | 370/941 |
| 5,157,692 | 10/1992 | Horie et al. | 375/38 |
| 5,161,156 | 11/1992 | Baum et al. | 371/7 |
| 5,218,676 | 6/1993 | Ben-ayed et al. | 395/200 |
| 5,412,782 | 5/1995 | Hausman et al. | 395/250 |
| 5,521,916 | 5/1996 | Choudhury et al. | 370/414 |
| 5,581,705 | 12/1996 | Passisnt et al. | 395/200.13 |

FOREIGN PATENT DOCUMENTS

| | | |
|---|---|---|
| 0501524A2 | 5/1984 | European Pat. Off. . |
| 0460599A3 | 4/1991 | European Pat. Off. . |
| 0460599 | 12/1991 | European Pat. Off. . |
| WO 88/08652 | 4/1988 | WIPO . |
| 88/01341 | 11/1988 | WIPO . |

OTHER PUBLICATIONS

Bradley R. Carlile, "Algorithms and Design: The CRAP APP Shared–Memory System", *COMPCON Spring '93, San Francisco, CA*, 312–320, (Feb. 22, 1993).

Barbara Chapman, et al., "Programming in Vienna Fortran", *Dept. of Statistics and Coputer Science*, 121–160.

Erik Debenedictis, et al., "Extending Unix for Scalable Computing", *IEEE*, 43–53, (Nov. 1993).

Tom Mcdonald, et al., "Addressing in Cray Research's MPP Fortran", *Third Workshop on Compilers for Parallel Computers*, 161–172 (Jul. 7, 1992).

*Primary Examiner*—Dinh C. Dung
*Attorney, Agent, or Firm*—Schwegman, Lundberg, Woessner, and Kluth, P.A.

[57] ABSTRACT

A messaging facility in a multiprocessor computer system includes assembly circuitry in a source processing element for assembling a message to be sent from the source processing element to a destination processing element based on information provided from a processor in the source processing element. A network router transmits the assembled message from the source processing element to the destination processing element via an interconnect network. A message queue in a local memory of the destination processing element stores the transmitted message. A control word stored in the local memory of the destination processing element includes a limit field designating a size of the message queue and a tail field designating an index into the corresponding message queue to indicate a location in the message queue where the transmitted message is to be stored. Shell circuitry in the destination processing element atomically reads and updates the tail field.

20 Claims, 6 Drawing Sheets

MESSAGING IN DISTRIBUTED MEMORY MULTIPROCESSING SYSTEM HAVING SHELL CIRCUITRY FOR ATOMIC CONTROL OF MESSAGE STORAGE QUEUE'S TAIL POINTER STRUCTURE IN LOCAL MEMORY

STATEMENT REGARDING GOVERNMENT RIGHTS

The present invention was made with government support under MDA 972-95-3-0032, awarded by ARPA. The Government has certain rights in this invention.

FIELD OF THE INVENTION

The present invention relates generally to the field of high-speed digital data processing systems, and more particularly, to a messaging facility for a distributed memory multiprocessor computer system.

BACKGROUND OF THE INVENTION

Multiprocessor computer systems comprise a number of processing element nodes connected together by an interconnect network. Each processing element node includes at least one processing element. The interconnect network transmits packets of information or messages between processing element nodes. Packets comprise multiple physical transfer units (phits). A phit is typically the width of a network physical communication link or physical channel between processing element nodes. Multiprocessor computer systems having hundreds or thousands of processing element nodes are typically referred to as massively parallel processing (MPP) systems.

Many MPP systems are defined as multicomputers, wherein each processing element is considered a stand-alone computer with its own central processor, local memory, and associated control logic. In a multicomputer, each processing element can only address its own local memory and cannot directly read or write the local memory associated with another processing element. Each processing element reads data from another processing element's memory by sending a message and input/output (I/O)-like packet, to the target processing element requesting that some data from its memory be formatted and sent back to the requesting processing element, or vice versa for writes. Thus in a multicomputing system, each remote reference is essentially an I/O operation. This style of interprocessor communications is called "message passing." Message passing is a well-known and prevalent MPP system programming model because multicomputers are relatively easy to build. The ease of construction of a multicomputer arises from the use of commodity microprocessors in an environment that closely resembles their "natural habitat" (i.e., that hardware and software implementation envisioned by the microprocessor designers), that is, a network of small autonomous computers.

For many applications, however, a multiprocessor MPP system is more desirable than a multicomputing MPP system. In a multiprocessor MPP, every processing element can directly address all of memory, including the memory of another (remote) processing element, without involving the processor at that processing element. Instead of treating processing element-to-remote-memory communications as an I/O operation, reads or writes to another processing element's memory are accomplished in the same manner as reads or writes to the local memory.

Multiprocessors have an ease-of-programming advantage over multicomputers. In a multicomputer, each communication between processing element's must be explicitly coordinated and initiated by the programmer. In a multiprocessor, however, communications arise naturally and implicitly by the specification of variables and constants in program statements. If the data represented by the variable or constant name happens to reside in the memory of a remote processing element, an access of the data there is automatically initiated the same manner as if the data were in local memory.

Software techniques are known which allow the emulation of a multiprocessor and its associated ease-of-programming on a multicomputer. Such software emulators translate the application program remote reads and writes into explicit I/O-like message-passing operations in a way that is hidden from the application programmer. Software control of a global address space using message passing is very inefficient, however, because I/O-like operations have a large software start-up overhead associated with each message. Successful message passing programming models on multicomputers rely on relatively large granularity programming, passing large amounts of data with each communication, to amortize the startup overhead over many elements of data.

An efficient message-passing facility for a multiprocessor MPP system is described in co-pending and commonly assigned U.S. patent application Ser. No. 08/166,443 filed on Dec. 13, 1995 entitled "MESSAGING FACILITY FOR DISTRIBUTIVE MEMORY MASSIVELY PARALLEL PROCESSING SYSTEM," now U.S. Pat. No. 5,581,705 and which is incorporated herein by reference. This messaging facility provides certain hardware primitives to allow one processing element to send data to another processing element's dedicated message queue and interrupt the target processing element upon message arrival. The hardware supported messaging facility permits emulation of a multi-computing MPP system on a multiprocessing MPP system. This messaging facility enables the passing of packets of data from one processing element to another without having an explicit destination address in the target processing element's memory. A message is a special cache-line-size remote write that has as its destination a hardware-managed message queue in the memory of the receiving processing element. Arriving messages are placed in the message queue in the order that they arrive by hardware mechanisms that also provide the lowest-level communication handshaking protocol service. Flow control between processing elements is accomplished by the queue management hardware, with software intervention used as necessary to deal with the error cases caused by queue overflows, and the like.

The preferred embodiment of the messaging facility described in the U.S. Pat. No. 5,581,705, however, has a fixed sized message queue in a designated area of the local memory. In addition, there is only one message queue in each processing element node. Furthermore, interrupt circuitry in the destination node generates an interrupt to the processor in the destination node each time a message is written into the message queue in the destination node. There is, therefore, a need for a messaging facility in a multiprocessor computer system which uses variable size message queues and has the capability of having a variable number of message queues in each processing element node. There is also the need for a messaging facility that does not require interrupting the processor in the destination node each time a message is written into the destination queue, but which is still efficient in passing messages between processing element nodes. A shared memory message queue, for example, is very inefficient because each processor needs to acquire access or rights to the shared memory message queue prior to altering information in the shared memory message queue, such as with a locking or similar semaphore type operation.

SUMMARY OF THE INVENTION

The present invention provides a messaging facility in a multiprocessor computer system having a plurality of processing elements interconnected by an interconnect network. Each processing element includes a processor and a local memory. Globally addressable portions of local memory of each processing element form a distributed memory. The messaging facility includes assembly circuitry in a source processing element for assembling a message to be sent from the source processing element to a destination processing element based on information provided from the source processing element's processor. A network router transmits the assembled message from the source processing element to the destination processing element via the interconnect network. A message queue in the local memory of the destination processing element stores the transmitted message. A control word stored in the local memory of the destination processing element includes a limit field designating a size of the message queue and a tail field designating an index into the corresponding message queue to indicate a first location in the message queue where the transmitted message is to be stored. Shell circuitry in the destination processing element atomically reads and updates the tail field. In this atomic operation, the tail field is read to determine where to store the transmitted message and updated to point to a second location in the message queue where a next transmitted message is to be stored.

In one preferred embodiment of the present invention, the messaging facility includes interrupt circuitry. In this embodiment, the control word preferably includes a threshold field designating an interrupt location in the message queue. The interrupt circuitry generates an interrupt for the destination processing element's processor if the location indicated by the tail field is equal to the interrupt location indicated by the threshold field.

In one embodiment of the messaging facility, the destination processor maintains a head pointer designating an index into the corresponding message queue to indicate a location where the message is stored in the message queue for reading by the destination processing element's processor.

In one embodiment of the messaging facility of the present invention, the assembly circuitry includes a plurality of external registers. The message is assembled in an aligned block of external registers within the plurality of external registers. In another embodiment, the assembly circuitry includes a plurality of write buffers internal to the source processing element's processor.

In one embodiment of the messaging facility, the destination processing element polling the control word stored in the local memory of the destination processing element to ascertain if the transmitted message has been stored in the message queue.

In a preferred embodiment of the messaging facility of the present invention, the destination processing element includes shell circuitry to generate a send-accepted packet to be provided to the source processing element based on the tail field being less than the limit field to indicate that the designation processing element accepted the transmitted message. The shell circuitry generates a send-rejected packet to be provided to the source processing element based on the tail field being equal to or greater than the limit field to indicate that the message queue is full and that the designation processing element rejected the transmitted message.

The messaging facility of the present invention can include multiple message queues in the local memory of the destination processing element's local memory. The number of message queues in the destination processing element's local memory is preferably defined by software running on the destination processor. In one embodiment, an interrupt status register stores a multiple messages bit to indicate if the tail field is equal to the interrupt location indicated by the threshold field in multiple message queues.

In the message queue according the present invention, the size of each message queue is variable and the local microprocessor does not have to be interrupted with each message arrival. Yet, the messaging facility according to the present invention still provides an efficient one-way transversal of the interconnect network, and does not require the complicated locking mechanism such as is required with a shared memory message queue. While not requiring dedicated hardware message queues, the present invention provides flexibility in that the local processor can poll its queue to determine when a message has arrived. Alternatively, the flexibility of the messaging facility according to the present invention permits an interrupt to be generated in a variety of situations such as at the receipt of each message, at any specified number of messages, or when the message queue is full. Furthermore, the messaging facility according to the present invention can provide an arbitrary number of queues in each processing element.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

MPP SYSTEM

Figure 1:
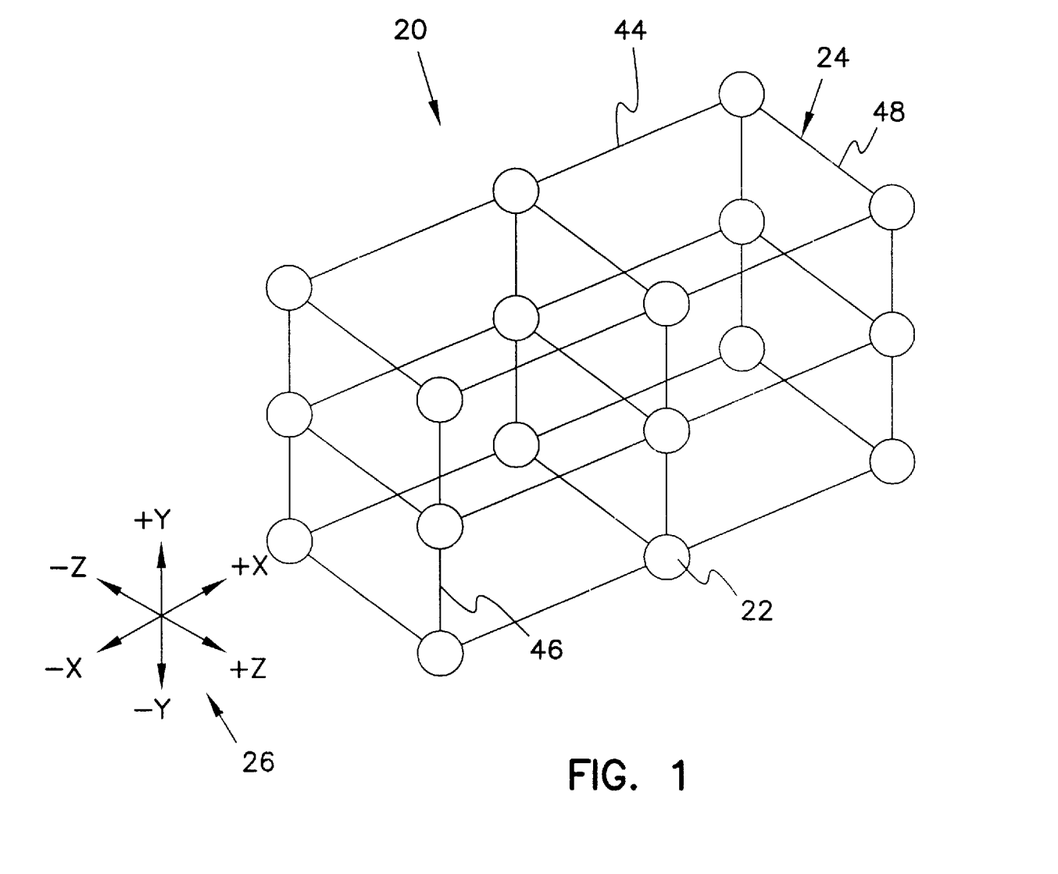
FIG. 1 is a simplified model of a massively parallel processing (MPP) system.

FIG. 1 illustrates a simplified model of the components of a massively parallel processing (MPP) system generally indicated at 20. MPP system 20 typically comprises hundreds or thousands of processing element nodes, such as processing element node 22. An interconnect network 24 provides communication paths among the processing element nodes in MPP system 20. In the model of system 20 illustrated in FIG. 1, interconnect network 24 forms a three-dimensional matrix of paths which connect the processing element nodes in the x, y, and z dimensions as indicated by arrows 26.

Figure 2:
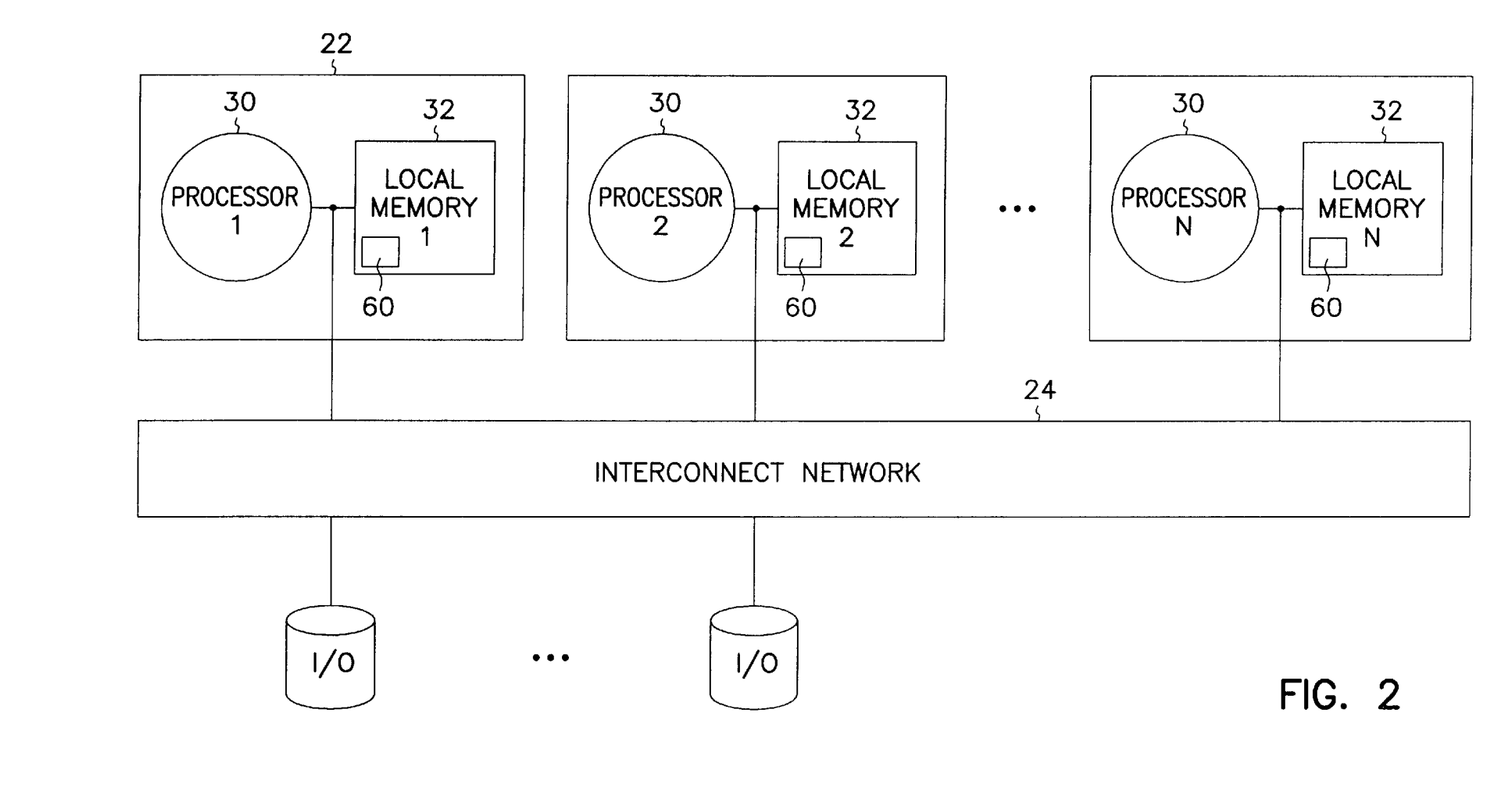
FIG. 2 is a simplified block of a MPP system.

A simplified block diagram of MPP system 20 is illustrated in FIG. 2. As illustrated in FIG. 2, each of the N processing elements, such as processing element 22, in MPP system 20 include a processor 30 connected to a local memory 32. In one embodiment, MPP system 20 is a MIMD massively parallel processing system with a physically distributed, globally addressable memory. Each processor 30 has a favored, low latency, high bandwidth path to an associated local memory 32, and a longer latency lower bandwidth access to the memory banks 32 associated with other processors 30 over the interconnect network 24.

In the preferred embodiment, the interconnect network 24 is comprised of a three-dimensional torus which, when connected, creates a three-dimensional matrix of processing elements. The torus design has several advantages, including high speed information transfers and the ability to avoid bad communication links. A toroidal interconnect network is also scalable in all three dimensions. Interconnect networks of this nature are described in more detail in the following co-pending and commonly assigned U.S. patent applications: U.S. Pat. No. 5,533,198, entitled "DIRECTION ORDER ROUTING IN MULTIPROCESSING SYSTEMS," by Gregory M. Thorson, filed Nov. 30, 1992 and U.S. Pat. No. 5,701,416, entitled "ADAPTIVE ROUTING MECHANISM FOR TORUS INTERCONNECTION NETWORK," by Thorson et al., filed Apr. 13, 1995, both of which are incorporated herein by reference.

Figure 3:
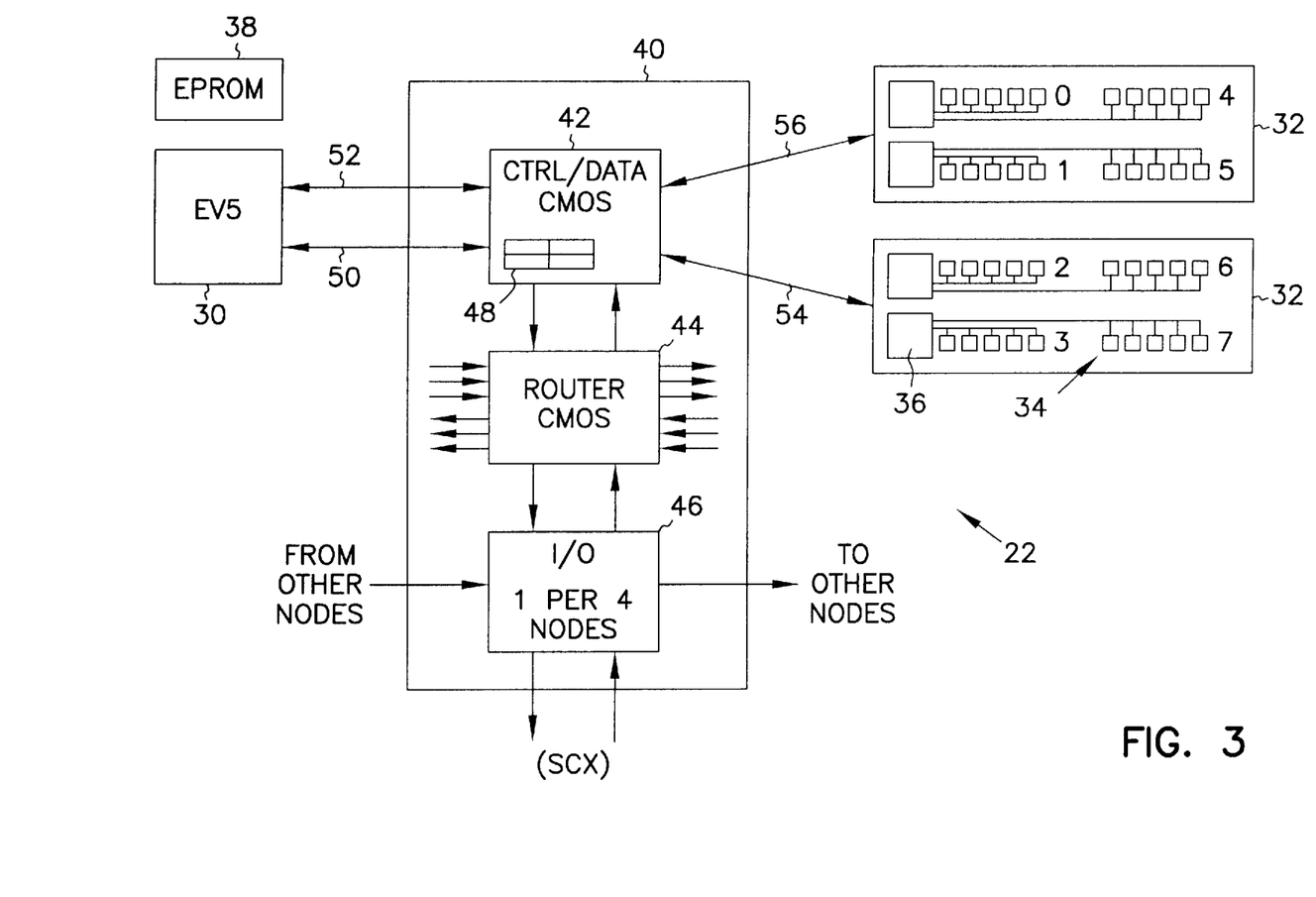
FIG. 3 is a block diagram of a processing element included in the MPP system of FIGS. 1 and 2.

FIG. 3 illustrates a simplified block diagram of one embodiment of processor element 22. In this embodiment, processor element 22 includes a high-performance reduced instruction set computer (RISC) microprocessor 30 such as the EV5 microprocessor (DEC P/N 21164) or the EV56 microprocessor (DEC P/N 21164A), both available from Digital Equipment Corporation. Each microprocessor 30 is coupled to a local memory 32 that is a distributed portion of the globally-addressable system memory. Local memories 32 can be formed, for instance, by stacking a plurality of dynamic random access memories (DRAM) integrated circuits 34 configured as banks of memory operating under control of memory bank controllers 36. Microprocessor 30 is also connected to a nonvolatile memory 38, such as an erasable programmable read only memory (EPROM) used to store relatively unchanging information such as, for instance, boot program code.

Each processing element 22 further includes shell circuitry 40 that implements synchronization and communication functions facilitating interactions between processor elements 30. Shell circuitry 40 includes external registers circuit 42 and an interconnection network router 44 used to connect multiple processing elements 22 in a three-dimensional toroidal "fabric." The toroidal interconnect network carries all data communicated between processing elements 22 and those memories 32 that are not local to the particular processing element 22. In one embodiment, external registers circuit 42 permits asynchronous (i.e., independent of the local processor) movement of data, including blocks of data, between processor 30 and remote memories 32 associated with other processing elements 22 and between local memory 32 and remote processors 30 associated with other processing elements 22. In addition, external registers circuit 42 is optionally used to provide flexible addressing modes that permit a high degree of control over the redistribution of data between shared portions of the system memory.

As is illustrated FIG. 3, shell circuitry 40 also includes an input/output circuit 46 used to communicate over a high-speed channel with one or more input/output devices (not shown). Such a high-speed channel is described a commonly assigned patent application Ser. No. 08/614,854, entitled "RECONFIGURABLE RING BASED NETWORK SYSTEM," filed on even date herewith, and which is herein incorporated by reference.

Figure 4:
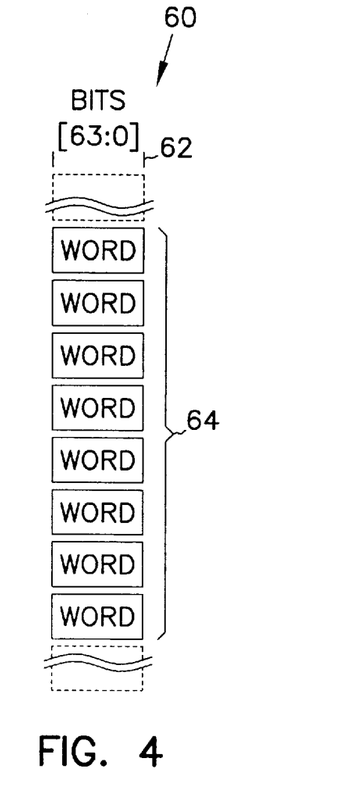
FIG. 4 is diagram illustrating a portion of a message queue used in the MPP system of FIGS. 1 and 2.

In the embodiment of processing element 22 illustrated in FIG. 4, microprocessor 30 is connected through external register circuit 42 to memory 32. External register circuit 42 includes a plurality of external registers (E-registers) 48. Microprocessor 30 is capable of reading from and writing to E-registers 48 via external data path 50 and external address path 52. Likewise, external register circuit 42 is capable of reading from and writing to memory 32 via memory data path 54 and memory address path 56.

As mentioned above, microprocessor 30 can be implemented in a commodity microprocessor, such as the EV5 or the EV56 available from Digital Equipment Corporation. Commodity microprocessor implementations impose limitations on the types of application behaviors that can be supported efficiently. External register circuit 42 provides a means to extend the capabilities of the commodity microprocessor with minimal requirements imposed on microprocessor 30.

E-registers 48 are mapped directly into the memory space of microprocessor 30. This provides high-bandwidth and low-latency load and store access to the registers themselves. In addition, in one embodiment, special memory-mapped store operations are used to provoke the E-registers to reference normal memory locations. These special operations include the ability to move data to/from E-registers 48 and memory locations in memory 32, to perform memory synchronization operations, initiate message transfers (to, for instance, other microprocessors), and to perform local operations that otherwise cannot be performed quickly within microprocessor 30. E-registers 48 serve as source or destination for additional operands and can be used to store the results of operations on operands supplied by microprocessor 30 or even for the results of operations on those operands previously stored in E-registers 48. More detail of the description, use, and advantages of E-registers is described in a commonly assigned patent application Ser. No. 08/615,671, entitled "METHOD AND APPARATUS FOR EXTENDING MEMORY REFERENCE CAPABILITIES OF A MICROPROCESSOR," filed on even date herewith, and which is herein incorporated by reference.

In one embodiment of the processing element illustrated in FIG. 3, a memory location in memory 32 local to a particular processing element can be accessed in two ways: a direct (cacheable) load or store by the processor, or an indirect (non-cacheable) operation through the external registers (E-registers) 48 in external register circuit 42. The virtual address used to access the memory location can be the same in both cases. Processor load and store instructions can reference only local memory. An on-chip DTB translates the virtual addresses to local physical addresses when the processor directly issues loads and stores. Shell circuitry 40 translates the virtual address to a (either local or remote) physical address when the processor issues E-register GET and PUT references.

Information is transferred between the processing element nodes 22 via the interconnect network 24 in the form of a packet. Each packet preferably comprises a header. The header includes routing information that steers the packet through the network, destination information that indicates which processing element should receive the packet, and control information that instructs the processing element that receives the packet to perform an operation. The header may also contain source information that indicates which processing element created the packet and may contain memory address information. A packet optionally comprises a body. The body of a packet typically includes data to be transferred between processing element nodes or system data from or to a host system.

The network routers, such as network router 44, at each processing element node 22 transfer packets through communication links in interconnect network 24 based on the routing information contained in each header of each packet. The header and the body have variable lengths and transfer over the communication links one phit at a time. MPP system 20 preferably uses wormhole routing. Preferred methods of routing the packets with wormhole routing are described in the above incorporated co-pending and commonly assigned U.S. patent application Ser. No. 07/983,979, entitled "DIRECTION ORDER ROUTING IN MULTI-PROCESSING SYSTEMS," by Gregory M. Thorson, filed Nov. 30, 1992 and U.S. patent application Ser. No. 08/421,566, entitled "ADAPTIVE ROUTING MECHANISM FOR TORUS INTERCONNECTION NETWORK," by Thorson et al., filed Apr. 13, 1995.

MESSAGING FACILITY

Messaging Components

A message is a packet of information that one processing element, such as processing element 22, sends to another processing element. After receiving a message, shell circuitry 40 in the destination processing element stores the message in a designated location in the associated local memory 32 of the destination processing element. This designated location in memory 32 is referred to as a message queue, such as message queue 60 shown in FIG. 2. When message queue 60 contains more than a specified amount of messages, as specified by software, shell circuitry 40 interrupts microprocessor 30, if software enables the interrupt. Microprocessor 30 then reads the messages from message queue 60.

The messaging facility of the present invention utilizes several hardware and software components. These components are described in more detail below and include: the message queue; a message queue control word (MQCW); a software-maintained head pointer; a SEND E-register command; a interrupt status (IR_STATUS) register; and a message address (MSG_ADDR) register.

Referring to FIG. 2, message queue 60 is a portion of local memory 32 that software designates as the destination for messages. Software defines at least one message queue, and possibly several individual message queues for each processing element 22. Software also defines the size of each message queue. Message queue 60, for example, stores from one to 2,097,151 messages in one embodiment of the present invention.

One form of message queue 60 is illustrated generally in FIG. 4. In this embodiment, each message comprises 64 bytes of information. Each 64-byte address location in the message queue 60 is referred to as a slot, such as slot 64 illustrated in FIG. 4. In the embodiment illustrated, the MQCW is a 64-bit word of information that software stores in bits [63:0] of a first slot 62 in message queue 60. Shell circuitry 40 and software use the information stored in the MQCW to perform messaging functions.

Figure 5:
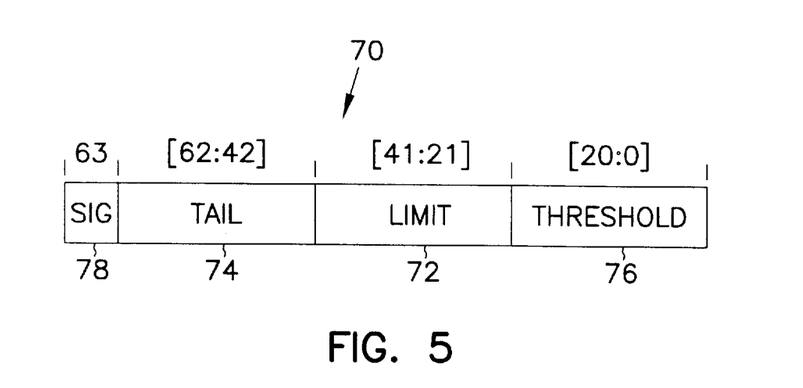
FIG. 5 is a diagram of message queue control word used to define the message queue of FIG. 4.

FIG. 5 illustrates a typical format of one embodiment of a MQCW illustrated generally at 70. MQCW 70 comprises four fields including: a limit field 72, a tail field 74, a threshold field 76, and a signal (SIG) bit 78. Limit field 72, tail field 74, and threshold field 76 represent offset values with respect to the address of MQCW 70.

Limit field 72 indicates a number of slots in message queue 60. For example, when limit field 72 is set to 50, message queue 60 contains 50 slots for 50 messages. Software sets the limit field value of limit field 72, which in one embodiment varies from between one and 2,097,151 to permit message queue 60 to store from one to 2,097,151 messages.

Tail field 74 indicates a slot, such as slot 64, in message queue 60 which is to receive the next message. When shell circuitry 40 receives a message, the shell circuitry stores the message in the slot pointed to by the tail field 74 of the MQCW. After storing the message in the indicated slot, shell circuitry 40 increments the tail field by one. Thus, shell circuitry 40 atomically reads and updates the tail field. In this atomic operation, the tail field is read to determine where to store the transmitted message and updated to point to a second location in the message queue where a next transmitted message is to be stored.

Threshold field 76 indicates which slot, such as slot 64, is to cause shell circuitry 40 to set an interrupt for the associated microprocessor 30. For example, when threshold field 76 is set to 30, shell circuitry 40 sets an interrupt for the associated microprocessor 30 when tail field 74 is equal to 30.

The state of SIG bit 78 indicates whether tail field 74 is equal to threshold field 76. Shell circuitry 40 sets SIG bit 78 to a one, when tail field 74 is equal to threshold field 76. Software resets SIG bit 78 to zero by writing a zero to the MQCW. Because hardware modifies MQCW 70 in an atomic read-modify-write operation, software manipulation of MQCW 70 does not conflict with the hardware updates of the MQCW.

Each microprocessor 30 maintains its own head pointer with software. The software-maintained head pointer value indicates the slot, such as slot 64, of the associated message queue 60 that is to be next read by the software of the local microprocessor 30. MPP system 20 hardware does not use, modify, or provide storage for the head pointer.

After reading a message from message queue 60, software controlling the local microprocessor 30 increments the head pointer to point to the next slot in the message queue. When the head pointer points to the same slot as the tail pointer indicated by tail field 74, software has then read all of the messages out of message queue 60.

Figure 6:
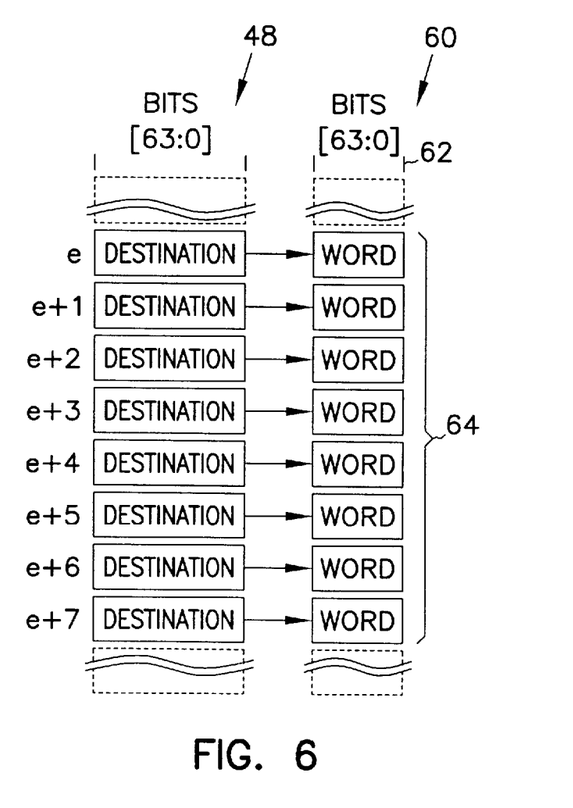
FIG. 6 is a diagram illustrating a message send E-register command used to transfer a message from source E-registers to a slot in a destination message queue.

FIG. 6 illustrates a message send (SEND) E-register command used to transfer a 64-byte (8-word) message from eight contiguous source E-registers of E-registers 48 to a 64-byte slot 64 in a destination processing element message queue 60. In FIG. 6, the "e" represents the E-register address, where the eight contiguous source E-registers begin at E-register address e and run through E-register address e+7. The SEND E-register command is described in more detail in the above-incorporated patent application entitled "METHOD AND APPARATUS FOR EXTENDING MEMORY REFERENCE CAPABILITIES OF A MICROPROCESSOR."

In one embodiment, the IR_STATUS register comprises a message address valid bit and a multiple messages bit used for messaging. The message address valid bit stored in the IR-STATUS register indicates that the tail value indicated by tail field 74 for a given message queue 60 is equal to the threshold value indicated by threshold field 76 for the given message queue 60. The given message queue 60 is identified by the MSG_ADDR register discussed in more detail below. The message address valid bit remains set to one until the bit is reset by software. The multiple messages bit indicates that the tail value of tail field 74 is equal to the threshold value of threshold field 76 in more than one message queue 60. The multiple messages bit remains set to one until software resets the bit.

Figure 7:
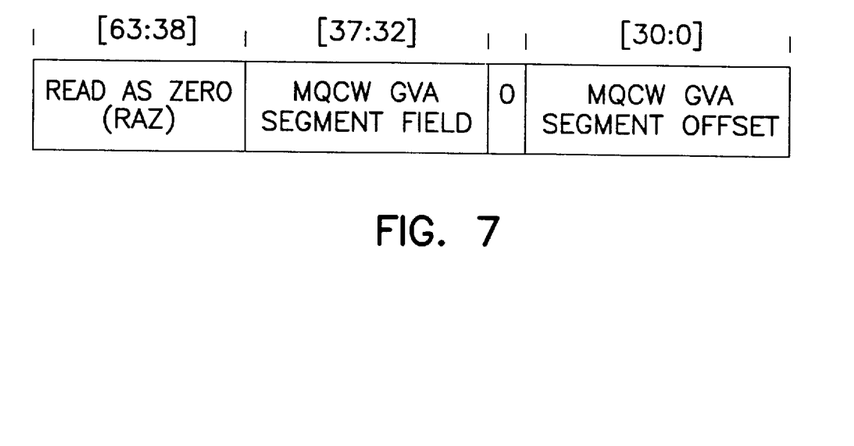
FIG. 7 is a diagram illustrating a Message address register format.

FIG. 7 illustrates the MSG_ADDR register format. The MSG_ADDR register comprises a global virtual address (GVA) of the MQCW for the particular message queue 60 that set the message address valid bit stored in the IR_STATUS register. The GVA in the MSG_ADDR register remains locked in the MSG_ADDR register until software resets the message address valid bit of the IR_STATUS register. Shell circuitry 40 stores a new GVA into the register the next time shell circuitry 40 sets the message address valid bit to one.

Defining a Message Queue

Before a destination processing element 22 can receive messages, software must define at least one message queue 60 for that processing element 22. Software defines a given message queue 60 by storing a MQCW to a location in local memory 32. The values in the MQCW fields define the given message queue 60.

For example, software sets limit field 72 of MQCW 70 to 50 to define a message queue 60 which is capable of storing as many as 50 messages. Software sets tail field 74 to a value greater than zero. If software were to set tail field 74 to zero, the first message would overwrite MQCW 70 because tail field 74 is an offset with respect to the MQCW address. Normally, software initially sets tail field 74 to one.

When software defines a message queue 60, threshold field 76 is set to any number greater than zero up to the limit field value. The threshold value stored in threshold field 76 must be at least one slot larger than the tail value stored in tail field 74 to generate an interrupt.

Sending a Message

Referring to FIG. 6, before sending a message, software stores data for a 64-byte message in eight contiguous E-registers of E-registers 48 that align on 64-byte boundary in the E-register address space. In one embodiment, software uses STORE E-register commands, to transfer data from a source microprocessor 30 to the E-registers 48. The STORE E-register command is described in more detail in the above-incorporated patent application entitled "METHOD AND APPARATUS FOR EXTENDING MEMORY REFERENCE CAPABILITIES OF A MICROPROCESSOR."

After storing data representing the message to be sent in the eight source E-registers of E-registers 48, software issues a SEND E-register command. The SEND command signals shell circuitry 40 in the source processing element 22 to send the stored message to the destination processing element 22. In one embodiment, a SEND E-register command address opcode argument indicates to shell circuitry 40 that the E-register command is a SEND, and also indicates whether the SEND command references a segment translation table (STT).

If software sets the SEND E-register command address opcode argument to indicate that the SEND command will reference the STT, shell circuitry 40 adds the index offset to the base virtual address to create a user virtual address. Shell circuitry 40 references the STT to convert the user virtual address to a GVA. When it sends a message, software sets SEND E-register command address arguments so that the GVA is the GVA for the MQCW 70 in the destination processing element 22.

When software sets the SEND E-register command address opcode argument to indicate that the SEND command will not reference the STT, shell circuitry 40 adds the index offset to the base virtual address to create the GVA. When software sends a message, software sets SEND E-register command address arguments so that the GVA is the GVA for the MQCW 70 in the destination processing element 22.

After shell circuitry 40 receives all of the SEND E-register command address arguments from the associated microprocessor 30, the shell circuitry sets E-register state (ERS) codes for the eight contiguous source E-registers of E-registers 48 to indicate that the E-register is empty. Shell circuitry 40 then creates a message packet and sends the message packet to the destination processing element 22 along interconnect network 24.

Shell circuitry 40 does not change the value of the ERS codes again until it receives a SEND-accepted or a SEND-rejected response packet. When shell circuitry 40 receives a SEND-accepted packet, shell circuitry 40 sets the ERS codes to indicate that the E-register is full and no errors occurred during the transfer, which indicates that the message was accepted by the destination processing element 22. When shell circuitry 40 receives a SEND-rejected packet, the shell circuitry sets the ERS codes to indicate that the E-register is full, but that a previous message SEND command that used the E-register was rejected, which indicates that the message queue was full and the message was not accepted by the destination processing element 22. When this condition occurs, software can resend the message.

The above described embodiment uses E-registers to assemble the messages in the source processing element. Nevertheless, other methods can be used to assemble the message. For example, a suitable assembly means, which comprises write buffers is described in detail in the above incorporated U.S. patent application Ser. No. 08/166,443 filed on Dec. 13, 1995 entitled "MESSAGING FACILITY FOR DISTRIBUTIVE MEMORY MASSIVELY PARALLEL PROCESSING SYSTEM."

The Ser. No. 08/166,443 application teaches that messages can be transmitted simply by writing a cache line to a special remote address. Messages are distinguished from ordinary remote cache-line writes by the mapping of the destination address. Special addresses are reserved in the physical memory address range to be interpreted as message transmission triggers. If a store is performed to the special address, hardware decodes the destination address to indicate that the store is actually a message send. The processing element shell circuitry then creates a message packet and sends the packet into the interconnection network for routing to the destination processing element.

In the MPP system described in the Ser. No. 08/166,443 application, messages are assembled in circuits on the microprocessor chip called "write buffers." The cache line write to the special address must be performed as sequential stores to addresses within the same cache line. The write buffers on the microprocessor attempt to assemble full cache lines before requesting a bus cycle and will succeed in most cases if no intervening memory references are made while sending a message. If the processor is interrupted while constructing the cache line message, the message will be sent as two incomplete cache lines in two separate messages (called message fragments). The half-word mask field in the message header must be examined by software upon receipt of a message to see if the entire message is present. If not, the receiving processor must defer processing of the message fragment until the remaining portions arrive.

In this embodiment, it is important to have an understanding of the functioning of the microprocessor write buffers in order to ensure proper message transmission. There are 4 buffers, each a cache-line in size. At every store, the microprocessor checks all 4 buffers for a possible match between the address of the current store and one that may be pending in the write buffers. If a match is found, the write data is merged into its proper place in the cache line as indicated by the word-within-cache-line bits in the address. If there was data at that spot in the write buffer from a previous store with the same cache line address and word-within-cache-line pointer, the previous data is lost.

The DECChip microprocessor used in the MPP system described in the Ser. No. 08/166,443 application keeps the data in the write buffers for an indeterminate amount of time, unless specific steps are taken to flush them to the memory subsystem. One or more write buffers will flush if: a store is made to an address that matches none of the cache-line addresses currently in the write buffers, a memory barrier instruction is issued, or an exception or interrupt occurs. Barring any of these occurrences, the write buffers will still drain eventually, but the timing of the actual write is difficult to predict.

It can be seen that if multiple messages are sequentially sent to a particular processor, different special cache line addresses must be used for any five message in a row, or unintentional merging of messages in the write buffers can occur.

Those skilled in the art can see that the message assembly functions of the write buffers could also easily be accomplished by buffers implemented external to the microprocessor if the microprocessor did not have write buffers or it was not desirable for some reason to use the on-board write buffers for message assembly.

Receiving and Storing a Message

When shell circuitry 40 in a destination processing element 22 receives a message, the shell circuitry references a location in local memory 32, which is identified by the message packet as the MQCW 70 location. After reading MQCW 70, shell circuitry 40 compares tail field 74 to limit field 72. When the tail value of tail field 74 is equal to the limit value of limit field 72, shell circuitry 40 creates a SEND-rejected packet and returns the SEND-rejected packet to the processing element 22 that created the message. The SEND-rejected packet indicates that the message queue is full and cannot accept another message.

When the tail value of tail field 74 is less than the limit value of limit field 72, shell circuitry 40 returns a SEND-accepted packet to the processing element 22 that created the message. Shell circuitry 40 then stores the message in message queue 60 in the destination processing element 22 at the slot pointed to by the tail pointer indicated by tail field 74. Shell circuitry 40 then increments the tail pointer by adding one to tail field 74 and stores the updated tail field value in the MQCW 70 in local memory 32 of the destination processing element 22.

Three example scenarios, where shell circuitry 40 in the destination processing element 22 accepts a message and stores the message in message queue 60, are described below to illustrate scenarios under the following three conditions: 1) the tail value is less than the threshold value; 2) the tail value is equal to the threshold value; and 3) the tail value is greater than the threshold value.

Figure 8:
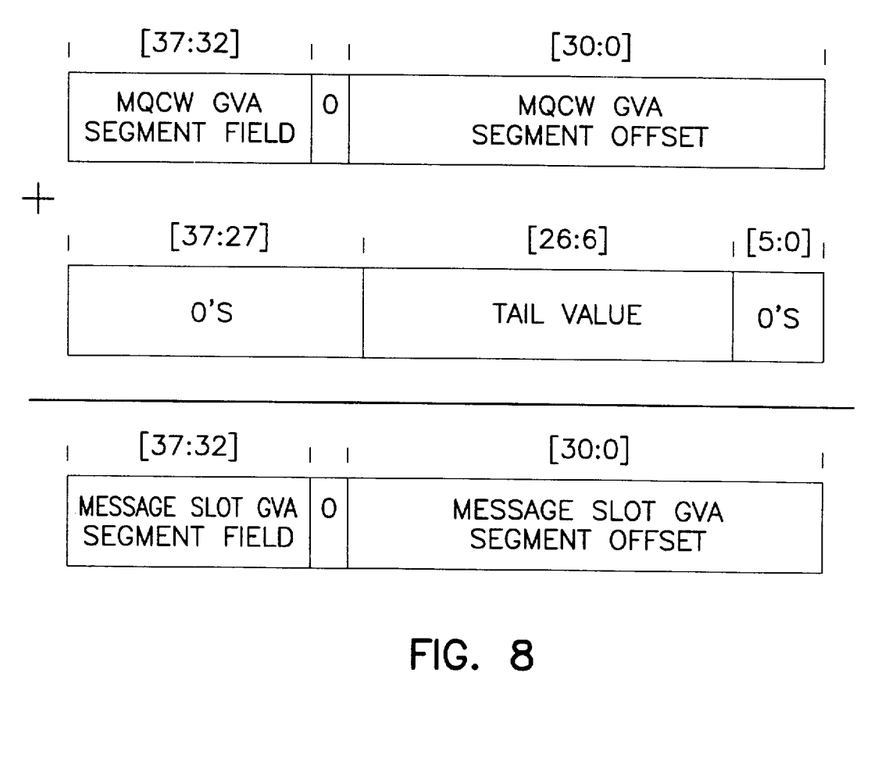
FIG. 8 is a diagram illustrating generating the message slot global virtual address (GVA).

In the first scenario, the tail value of tail field 74 is less than the threshold value of threshold field 76. In this example scenario, for illustrative purposes limit field 72 is equal to four, tail field 74 is equal to one, and threshold field 76 is equal to three. Referring to FIG. 8, which illustrates generating the message slot GVA, shell circuitry 40 shifts the tail value six positions to the left and adds the shifted value to the GVA of the MQCW. The resulting sum is the byte-address GVA for the destination slot in the message queue. After adding the MQCW GVA to the shifted tail value, shell circuitry 40 sets bits [5:0] of the resulting address to zeros. By setting bits [5:0] to zero, a 64-byte aligned GVA is created for the destination slot in the message queue.

Figure 9A:
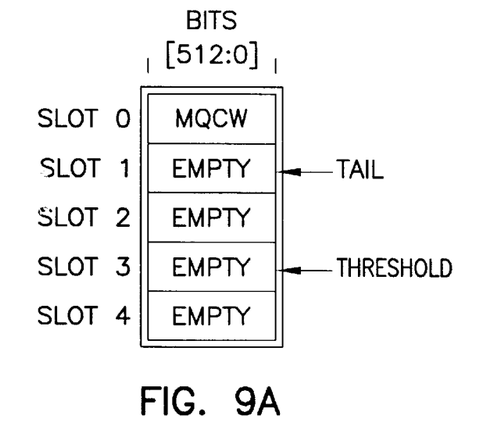
FIG. 9A illustrates a message queue before a message store in a scenario where a tail field value is less than a threshold field value.
Figure 9B:
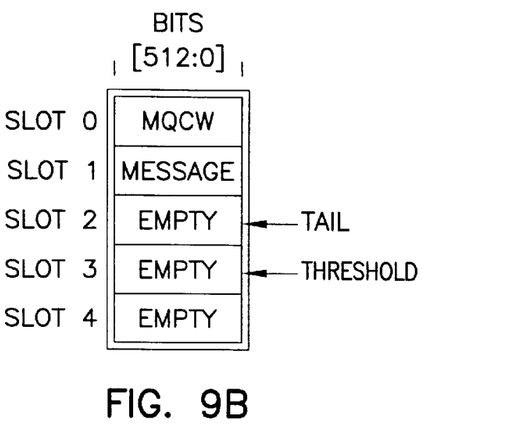
FIG. 9B illustrates a message queue after the message store the scenario where a tail field value is less than a threshold field value.

FIG. 9A illustrates the message queue before the message store, and FIG. 9B illustrates the message queue after the message store. Shell circuitry 40 stores the message in the slot that is identified by the message slot GVA and increments the tail value by one as illustrated in FIGS. 9A and 9B. To complete the message store operation, shell circuitry 40 compares the tail value to the threshold value. Since in this scenario, the tail value is less than the threshold value, shell circuitry 40 does not set a message interrupt for the local microprocessor 30.

In the second scenario, the tail value stored in tail field 74 is incremented and becomes equal to the threshold value stored in threshold field 76. In this scenario, initially, limit field 72 is equal to four, tail field 74 is equal to two, and threshold field 76 is three.

Again, referring to FIG. 8 to illustrate generating the message slot GVA, shell circuitry 40 shifts the tail value six positions to the left and adds the shifted value to the GVA of the MQCW. This sum represents the GVA for the destination slot in the message queue 60 in local memory 30. After the GVA of the MQCW is added to the shifted tail value, shell circuitry 40 sets bits [5:0] of the resulting address to zeros. This creates a 64-byte aligned GVA for the destination slot in the message queue.

Figure 10A:
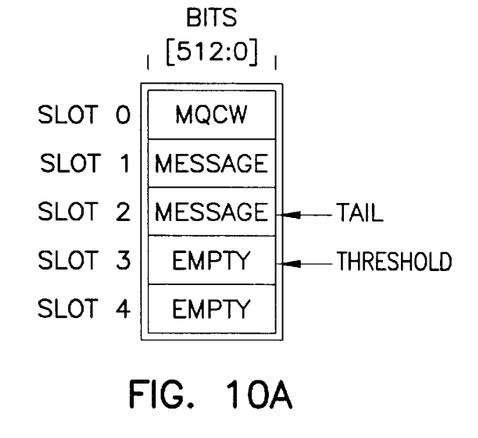
FIG. 10A illustrates a message queue before a message store in a scenario where a tail field value is equal to a threshold field value.
Figure 10B:
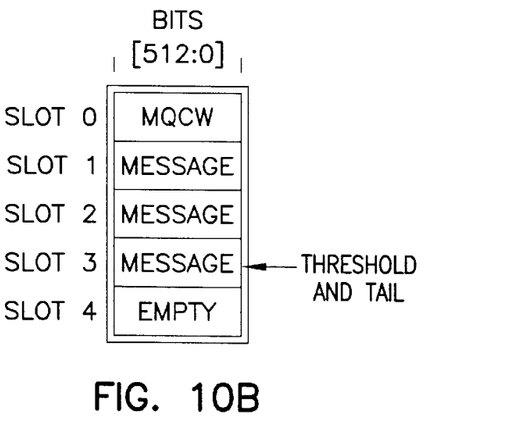
FIG. 10B illustrates a message queue after the message store the scenario where a tail field value is equal to a threshold field value.

Similar to FIGS. 9A and 9B illustrating the first scenario, FIG. 10A illustrates the message queue before a message is stored, and FIG. 10B illustrates the message queue after a message is stored for the second scenario. Shell circuitry stores the message in the slot identified by the message slot GVA and increments the tail value by one as indicated by the move of the tail pointer from slot 2 to 3 as illustrated in FIGS. 10A and 10B.

After the message is stored in the message queue, shell circuitry 40 compares the tail value to the threshold value.

Since in the second scenario the tail value is equal to the threshold value after the tail value is incremented as a result of the message store, shell circuitry 40 sets SIG bit 78 of the MQCW for the message queue to one to indicate that the tail value is equal to the threshold value.

Shell circuitry 40 then examines the value of the message address valid bit stored in the IR_STATUS register. When the message address valid bit is set to zero, shell circuitry 40 sets the message address valid bit to one, stores the GVA for the MQCW in a MSG_ADDR register, and locks the MSG_ADDR register. If software enables the interrupt, the message address value bit equal to one condition sets an interrupt for the microprocessor. When the message address valid bit is set to one, shell circuitry 40 checks the value of the multiple messages bit of the IR_STATUS register. If the multiple message bit is set to zero, shell circuitry 40 sets the multiple messages bit to one. In either case, after the shell circuitry examines the value of the message address valid bit of the IR_STATUS register, and performs a necessary operation based on the state of this bit, the message store operation is complete.

In the third scenario, the tail value of tail field 74 is greater than the threshold value of threshold field 76. For illustrative purposes, in this scenario, limit field 72 is four, tail field 74 is three, and threshold field 76 is two.

Referring back to FIG. 8, shell circuitry 40 shifts the tail value six positions to the left and adds this value to the GVA of the MQCW. The resulting sum is a GVA for the destination slot in the message queue 60 of the local memory 32. After the GVA of the MQCW is added to the shifted tail value, shell circuitry 40 sets bits [5:0] of the resulting address to zero. Setting bits [5:0] to zero creates a 64-byte aligned GVA for the destination slot in the message queue.

Figure 11A:
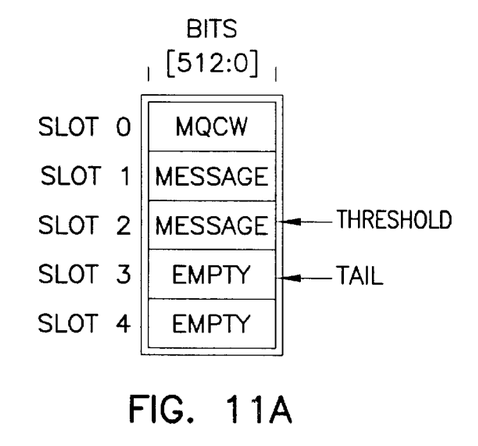
FIG. 11A illustrates a message queue before a message store in a scenario where a tail field value is greater than a threshold field value.
Figure 11B:
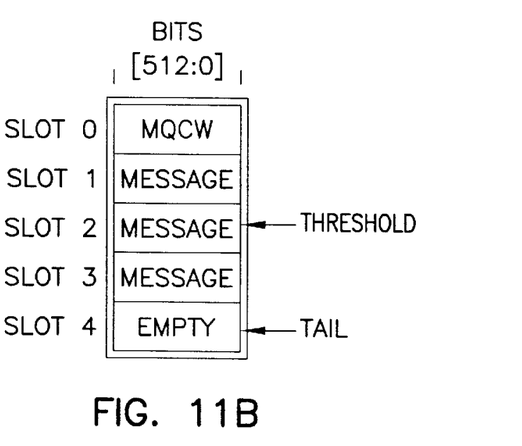
FIG. 11B illustrates a message queue after the message store the scenario where a tail field value is greater than a threshold field value.

As with FIGS. 9A and 9B for the first scenario and as with FIGS. 10A and 10B for the second scenario, FIG. 11A illustrates the message queue before a message store, and FIG. 11B illustrates the message queue after a message store for the third scenario. Shell circuitry 40 stores the message in the slot as identified by the message slot GVA and increments the tail value by one as illustrated in FIGS. 11A and 11B. After the message is stored, shell circuitry 40 compares the tail value to the threshold value. Since in this example the tail value is greater than the threshold value, shell circuitry 40 does not set a message interrupt for the microprocessor. As a result, shell circuitry 40 does not modify SIG bit 78 of the MQCW. Thus, unless SIG bit 78 has been reset by software, the SIG bit for the message queue remains set to one. Similarly, if SIG bit 78 has been reset by software, the SIG bit remains set to zero.

Shell circuitry 40 does not modify the message address valid bit or the multiple messages bit of the IR_STATUS register. Therefore, the message address valid bit and/or the multiple messages bit of the IR_STATUS register remains set to one, if they have not been reset by software. If these bits have been reset by software, these bits remain set to zero. In any case, this completes the message store operation for the third scenario.

Reading a Message

As with storing a message in the message queue, reading a message from the message queue can best be illustrated with a variety of scenarios which show how software reads messages out of the message queues. These scenarios provide examples for illustrative purposes only, and therefore, the example scenarios do not necessarily reflect the actual methods used by software in the preferred embodiment. In all of these scenarios, software enables the message address valid and the multiple messages interrupts in the IR_STATUS register. Alternatively, software polls the MQCW tail pointer stored in tail field 74 to determine when messages have arrived.

When software enables the message address valid and the multiple messages interrupts in the IR_STATUS register, three scenarios exist when the local microprocessor 30 receives an interrupt from shell circuitry 40 which include: 1) the message address valid bit is one and the multiple messages bit is zero; 2) the message address valid bit is one and the multiple messages bit is one; and 3) the message address valid bit is zero and the multiple message bit is one.

In the first scenario, the message address valid bit is equal to one and the multiple messages bit is equal to zero. The following steps describe a process software can use to read messages out of the message queue. In this scenario for illustrative purposes, software defines a message queue with limit field 72 set to 30, tail field 74 set to one, and threshold field 76 set to 25.

Initially, the local microprocessor 30 receives an interrupt from shell circuitry 40. The operating system software running in microprocessor 30 reads the value of the IR_STATUS register to obtain the values of the message address valid interrupt and the multiple messages interrupt bits. The operating system software then reads the value stored in the MSG_ADDR register, which represents the value of the GVA of the message queue that caused shell circuitry 40 to set the message address valid interrupt.

The operating system software then resets the message address valid interrupt to zero by writing a one to the message address valid bit of the IR_STATUS register.

The operating system software then signals user software that a message queue contains messages and provides user software with the GVA of the MQCW. User software then performs an atomic SWAP command on the MQCW. The swaperand value of the SWAP command comprises new MQCW values which provide a limit field 72 of 60, a tail field 74 of 31, a threshold field 76 of 55, and a SIG bit 78 of zero.

User software then retrieves the value of the software-contained head pointer for the message queue. The head pointer indicates the slot location of the next message to be read out of the message queue. User software then sends a command to shell circuitry 40 to read the message that is referenced by the head pointer. The command can be any command that accesses local memory 32. For example, the command can be a direct local memory load command or a get vector E-register command.

User software then processes the message. After processing the message, user software increments the value of the head pointer by one slot and compares the value of the head pointer to the tail pointer. When the head pointer is less than the tail pointer, user software again sends a command to shell circuitry 40 to read the message that was referenced by the head pointer, processes the message, and increments the value of the head pointer by one slot. User software repeats this process until, after being incremented by one slot, the head pointer is equal to the tail pointer to indicate that user software has read all the messages out of the message queue.

The next time microprocessor 30 receives an interrupt due to this message queue exceeding the threshold value, operating system and user software repeats the above steps, except that when the SWAP command is performed, user software sets the new MQCW values to set limit field 72 to 30, tail field 74 to one, threshold field 76 to 25, and SIG bit 78 to zero. This process creates two virtual message queues that use the same MQCW.

In the second scenario, the message address valid interrupt bit is equal to one and the multiple messages interrupt bit is equal to one. The following steps describe a process software can use to read messages out of the message queue for this scenario. For illustrative purposes, user software defines multiple message queues and each message queue is initially set to have limit field 72 equal to 30, and threshold field 76 equal to 25.

Initially, microprocessor 30 receives an interrupt from shell circuitry 40. Operating system software running in the local microprocessor 30 reads the value of the IR_STATUS register to read the message address valid interrupt bit and the multiple messages bit. Operating system software then reads the value stored in the MSG_ADDR register to obtain the value of the GVA of the first message queue that causes shell circuitry 40 to set the message interrupt. Operating system software resets the message address valid and multiple messages interrupts to zero by writing a one to the message address valid and multiple messages bits of the IR_STATUS register. The operating system software then signals the user software that multiple message queues contain messages and provides user software with the GVA of the first MQCW. For this first MQCW, SIG bit 78 is set to one.

User software reads the MQCW from memory 32 and examines SIG bit 78. When SIG bit 78 is set to zero, software does not read messages from that message queue and instead retrieves the GVA for the MQCW of another message queue. When SIG bit 78 is set to one, software continues with the following steps.

User software performs an atomic SWAP command on the MQCW. The swaperand value for the SWAP command comprises new MQCW values which set limit field 72 to 60, tail field 74 to 31, threshold field 76 to 55, and SIG bit 78 to zero.

User software then retrieves the value of the software-contained head pointer for this message queue. The head pointer indicates a slot location and the next message to be read out of the message queue. User software then sends a command to shell circuitry 40 to read the message that is referenced by the head pointer. Again, as with the first scenario, this command may be any command that accesses local memory such as a direct local memory load command or a get vector E-register command.

User software then processes the message. After processing the message, user software increments the value of the head pointer by one slot and compares the value of the head pointer to the tail pointer. When the head pointer is less than the tail pointer, user software again sends a command to shell circuitry 40 to read the message that is referenced by the head pointer, processes the message, and increments the value of the head pointer by one slot, and compares the value of the head pointer to the tail pointer. User software repeats these steps until the head pointer is equal to the tail pointer, at which point, user software has read all the messages out of the message queue.

User software then reads the second MQCW from memory and examines the SIG bit for the next defined message queue. The above steps performed for the first message queue are repeated for the second message queue until user software has read all the messages out of the second message queue as indicated when the head pointer is equal to the tail pointer. The above steps are repeated by user software for each message queue defined in the given processing element 22.

In the third scenario, the message address valid interrupt bit is equal to zero and the multiple messages bit is equal to one. When this scenario occurs, operating system software and user software running in the local microprocessor 30 perform the same functions and steps described above for the second scenario where the message address valid bit is equal to one and the multiple messages bit is equal to zero, except that the MSG_ADDR register does not contain a valid GVA. Because the MSG_ADDR register does not contain a valid GVA, the operating system software does not read the value stored in the MSG_ADDR register representing the value of the GVA of the first message queue that causes shell circuitry 40 to set the message interrupt. In addition, instead of the operating system software signalling user software that multiple message queues contain messages and providing user software with the GVA of the first MQCW, the operating system software instead only signals user software that multiple message queues contain messages.

CONCLUSION

Thus, the messaging facility according to the present invention provides an arbitrary number of queues in each processing element. In addition, the size of each message queue is variable. Furthermore, the operating system operating on the local microprocessor does not have to be interrupted with each message arrival. However, the messaging facility according to the present invention still provides an efficient one-way transversal of the network of a MPP system, and does not require the complicated locking mechanism such as is required with a shared memory message queue. While not requiring dedicated hardware message queues, the present invention provides flexibility in that the local processor can poll its queue to determine when a message has arrived. Alternatively, the flexibility of the messaging facility according to the present invention permits an interrupt to be generated in a variety of situations such as at the receipt of each message, at any specified number of messages, or when the message queue is full. In other words, the threshold value of the threshold field in the MQCW permits great flexibility in deciding when the local microprocessor 30 is to be interrupted in response to messages being read into an associated message queue.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A messaging facility in a multiprocessor computer system having a plurality of processing elements interconnected by an interconnect network, each processing element including a processor and a local memory, wherein globally addressable portions of local memory of each processing element form a distributed memory, the messaging facility comprising:

assembly means in a source processing element for assembling a message to be sent from the source processing element to a destination processing element based on information provided from the source processing element's processor;

a network router for transmitting the assembled message from the source processing element to the destination processing element via the interconnect network;

a message queue in the local memory of the destination processing element for storing the transmitted message, wherein a control word stored in the local memory of the destination processing element includes a limit field designating a size of the message queue and a tail field designating an index into the corresponding message queue to indicate a first location in the message queue where the transmitted message is to be stored; and shell circuitry in the destination processing element for atomically reading the tail field to determine where to store the transmitted message and updating the tail field to point to a second location in the message queue where a next transmitted message is to be stored.

2. The messaging facility of claim 1 further comprising interrupt means, and wherein the control word further includes a threshold field designating an interrupt location in the message queue, and wherein the interrupt means generates an interrupt for the destination processing element's processor if the location indicated by the tail field is equal to the interrupt location indicated by the threshold field.

3. The messaging facility of claim 1 wherein the destination processor maintains a head pointer designating an index into the corresponding message queue to indicate a location where the message is stored in the message queue for reading by the destination processing element's processor.

4. The messaging facility of claim 1 further comprising at least a second message queue in the local memory of the destination processing element's local memory.

5. The messaging facility of claim 4 wherein the control word further includes a threshold field designating an interrupt location in the message queue, and wherein the messaging facility further comprises:

interrupt means for generating an interrupt for the destination processing element's processor if the location indicated by the tail field is equal to the interrupt location indicated by the threshold field; and multiple message status means for indicating if the tail field is equal to the interrupt location indicated by the threshold field in multiple message queues.

6. The messaging facility of claim 1 wherein the assembly means comprises a plurality of external registers, and wherein the message is assembled in an aligned block of external registers within the plurality of external registers.

7. The messaging facility of claim 1 wherein the assembly means comprises a plurality of write buffers internal to the source processing element's processor.

8. The messaging facility of claim 1 wherein the destination processing element includes polling means for polling the control word stored in the local memory of the destination processing element to ascertain if the transmitted message has been stored in the message queue.

9. The messaging facility of claim 1 wherein the shell circuitry in the destination processing element generates a send-accepted packet to be provided to the source processing element based on the tail field being less than the limit field to indicate that the designation processing element accepted the transmitted message.

10. The messaging facility of claim 1 wherein the shell circuitry in the destination processing element generates a send-rejected packet to be provided to the source processing element based on the tail field being equal to or greater than the limit field to indicate that the message queue is full and that the designation processing element rejected the transmitted message.

11. A method of passing messages in a multiprocessor computer system having a plurality of processing elements interconnected by an interconnect network, each processing element including a processor and a local memory, wherein globally addressable portions of local memory of each processing element form a distributed memory, the method comprising the steps of:

assembling a message to be sent from a source processing element to a destination processing element based on information provided from the source processing element's processor;

transmitting the assembled message from the source processing element to the destination processing element via the interconnect network; and defining a message queue in the local memory of the destination processing element for storing the transmitted message;

defining a control word which includes a limit field designating a size of the message queue and a tail field designating an index into the corresponding message queue to indicate a first location in the message queue where the transmitted message is to be stored;

storing the control word in the local memory of the destination processing element; and atomically reading the tail field to determine where to store the transmitted message and updating the tail field to point to a second location in the message queue where a next transmitted message is to be stored.

12. The method of claim 11 wherein the control word is further defined to include a threshold field designating an interrupt location in the message queue, and wherein the method further includes the step of generating an interrupt for the destination processing element's processor if the location indicated by the tail field is equal to the interrupt location indicated by the threshold field.

13. The method of claim 11 further comprising the step of maintaining a head pointer designating an index into the corresponding message queue to indicate a location where the message is stored in the message queue for reading by the destination processing element's processor.

14. The method of claim 11 further comprising the step of defining at least a second message queue in the local memory of the destination processing element's local memory.

15. The method of claim 14 wherein the control word is further defined to include a threshold field designating an interrupt location in the message queue, and wherein the method further includes the steps of:

generating an interrupt for the destination processing element's processor if the location indicated by the tail field is equal to the interrupt location indicated by the threshold field; and indicating if the tail field is equal to the interrupt location indicated by the threshold field in multiple message queues.

16. The method of claim 11 wherein the assembling step includes the step of assembling the message in an aligned block of external registers within a plurality of external registers.

17. The method of claim 11 wherein the assembling step includes the step of writing the message to a plurality of write buffers internal to the source processing element's processor.

18. The method of claim 11 further comprising the step of polling the control word stored in the local memory of the destination processing element to ascertain if the transmitted message has been stored in the message queue.

19. The method of claim 11 further comprising the step of generating a send-accepted packet in the destination processing element to be provided to the source processing element based on the tail field being less than the limit field to indicate that the designation processing element accepted the transmitted message.

20. The method of claim 11 further comprising the step of generating a send-rejected packet in the destination processing element to be provided to the source processing element based on the tail field being equal to or greater than the limit field to indicate that the message queue is full and that the designation processing element rejected the transmitted message.

* * * * *